(12) United States Patent
Fahrner

(10) Patent No.: US 11,511,868 B1
(45) Date of Patent: Nov. 29, 2022

(54) PNEUMATIC DE-ICER WITH REDUCED NON-INFLATABLE AREA AT DE-ICER EDGE

(71) Applicant: Goodrich Corporation, Charlotte, NC (US)

(72) Inventor: Alan J. Fahrner, Canton, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 5 days.

(21) Appl. No.: 17/333,227

(22) Filed: May 28, 2021

(51) Int. Cl.
*B64D 15/16* (2006.01)

(52) U.S. Cl.
CPC .................. *B64D 15/166* (2013.01)

(58) Field of Classification Search
CPC .................. B64D 15/16; B64D 15/166
See application file for complete search history.

(56) References Cited

U.S. PATENT DOCUMENTS

| 5,112,011 A | 5/1992 | Weisend, Jr. et al. | |
| 5,310,142 A * | 5/1994 | Weisend, Jr. | B64D 15/166 |
| | | | 244/134 A |
| 5,337,978 A * | 8/1994 | Fahrner | B64D 15/166 |
| | | | 244/134 A |
| 5,449,133 A * | 9/1995 | Ely | B64D 15/166 |
| | | | 244/134 A |
| 5,813,631 A | 9/1998 | Butler et al. | |
| 2016/0214726 A1* | 7/2016 | Giamati | B64D 15/166 |
| 2018/0305031 A1* | 10/2018 | Fahrner | D05B 93/00 |
| 2019/0016467 A1* | 1/2019 | Botura | B64D 15/166 |

* cited by examiner

*Primary Examiner* — Richard G Davis
(74) *Attorney, Agent, or Firm* — Cantor Colburn LLP

(57) ABSTRACT

A de-icer is provided and includes first and second structural layers that each include centerline and a non-inflatable edge angled with respect to the centerline, edge sealing material disposed to adhere the first and second structural layers together to form a non-inflatable edge area extending along at least the non-inflatable edge and surrounding a central area and stitching. The stitching is disposed to stitch the first and second structural layers together in the central area to form tubes. The tubes include an outermost tube which is closest to and parallel with the non-inflatable edge.

20 Claims, 3 Drawing Sheets

PNEUMATIC DE-ICER WITH REDUCED NON-INFLATABLE AREA AT DE-ICER EDGE

BACKGROUND

The present disclosure relates to de-icers and, more particularly, to a pneumatic de-icer with a reduced non-inflatable area at a de-icer edge.

In certain aircraft applications, pneumatic de-icers are used to control the build-up of ice on aerodynamic surfaces. The de-icers are thin elastomeric blankets containing an array of fabric-reinforced tubes which inflate periodically to fracture and shed accreted ice. For example, for some turboprop airplanes, de-icers are provided on leading edges of wings and empennage to control the build-up of ice on those leading edges. In these or other cases, the de-icers can operate in one or more manners. In a first manner, the de-icer is commanded by the pilot to inflate and deflate once in order to break up ice. The ice, once fractured, naturally is removed from the surface where the de-icer is deployed by the scavenging effects of the airstream. In a second manner, the de-icer is periodically commanded by a timer on a repeating basis to inflate and deflate in order to break up and remove the ice.

In conventional instances, de-icers are applied and adhered to a surface and include multiple layers that are adhered and shown together. Typically, the perimeter area, which can be referred to as the "non-inflatable area," is adhered together, and the interior area, which can be referred to as the "carcass" or "inflatable area" is sewn to form multiple tubes along a longitudinal length of the de-icer. The non-inflatable area is often provided with a tapered cross section but also may have a uniform thickness along the edge of the de-icer and the tubes are often parallel with one another. This arrangement results in some situations where the non-inflatable area crosses the outermost tubes at an angle and, in so doing, leads to the borders of those outermost tubes having non-uniform loading on the non-inflatable area and variable and potentially unreliable adhesion to the airfoil surface. As a result, the width of the non-inflatable area has to be made relatively large in order to insure that the non-inflatable area can provide a reliable bond to the airfoil for the outermost tubes.

The relatively large width of the non-inflatable area in conventional instances of de-icers leads to either corresponding reduction in the relative sizes of the tubes or reduced operating capabilities when the overall size of the de-icer is limited such as in a recess in the airfoil surface for de-icer installation. In addition, even with the relatively large width, the non-inflatable areas may not provide a reliable bond to the airfoil surface.

Accordingly, a need exists for a de-icer with a non-inflatable area that has a reduced non-inflatable edge width and increased reliability.

BRIEF DESCRIPTION

According to an aspect of the disclosure, a de-icer is provided and includes first and second structural layers that each include centerline and a non-inflatable edge angled with respect to the centerline, edge sealing material disposed to adhere the first and second structural layers together to form a non-inflatable edge area extending along at least the non-inflatable edge and surrounding a central area and stitching. The stitching is disposed to stitch the first and second structural layers together in the central area to form tubes. The tubes include an outermost tube which is closest to and parallel with the non-inflatable edge.

In accordance with additional or alternative embodiments, the first and second structural layers each have a trapezoidal shape with the non-inflatable edge and an additional non-inflatable edge on opposite sides of the centerline.

In accordance with additional or alternative embodiments, the tubes include multiple central tubes which are parallel with the centerline, the outermost tube and an additional outermost tube which is closest to and parallel with the additional non-inflatable edge.

In accordance with additional or alternative embodiments, the stitching has a same pattern for each of the tubes and the outermost tube.

In accordance with additional or alternative embodiments, the non-inflatable edge area is about ~0.5 to about ~0.9375 inches (~1.27 to about ~2.38125 cm) wide.

In accordance with additional or alternative embodiments, the non-inflatable edge area is about ~0.75 to about ~0.875 inches (~1.905 to about ~2.2225 cm) wide.

In accordance with additional or alternative embodiments, the outermost tube is narrower than at least one of the other tubes.

According to an aspect of the disclosure, an aircraft is provided and includes an aerodynamic surface and a de-icer operably disposed on the aerodynamic surface.

In accordance with additional or alternative embodiments, the de-icer remains adhered to the aerodynamic surface during inflation and deflation of the tubes.

According to an aspect of the disclosure, a de-icer is provided and includes first and second structural layers, edge sealing material and stitching. The first and second structural layers each include wide and narrow ends, a centerline extending between the wide and narrow ends and a non-inflatable edge which extends between the wide and narrow ends and is angled with respect to the centerline. The edge sealing material is disposed to adhere the first and second structural layers together to form a non-inflatable edge area extending along at least the non-inflatable edge and surrounding a central area. The stitching is disposed to stitch the first and second structural layers together in the central area to form tubes. The tubes are inflatable and de-inflatable for de-icing operations and include an outermost tube which is closest to and parallel with the non-inflatable edge.

In accordance with additional or alternative embodiments, the first and second structural layers each have a trapezoidal shape with the non-inflatable edge and an additional non-inflatable edge on opposite sides of the centerline.

In accordance with additional or alternative embodiments, the tubes include multiple central tubes which are parallel with the centerline, the outermost tube and an additional outermost tube which is closest to and parallel with the additional non-inflatable edge.

In accordance with additional or alternative embodiments, the non-inflatable edge area extends along the wide and narrow ends, the non-inflatable edge and the additional non-inflatable edge.

In accordance with additional or alternative embodiments, the stitching has a same pattern for each of the tubes and the outermost tube.

In accordance with additional or alternative embodiments, the non-inflatable edge area is about ~0.5 to about ~0.9375 inches (~1.27 to about ~2.38125 cm) wide.

In accordance with additional or alternative embodiments, the non-inflatable edge area is about ~0.75 to about ~0.875 inches (~1.905 to about ~2.2225 cm) wide.

In accordance with additional or alternative embodiments, the outermost tube is narrower than at least one of the other tubes.

According to an aspect of the disclosure, an aircraft is provided and includes an aerodynamic surface and a de-icer operably disposed on the aerodynamic surface.

In accordance with additional or alternative embodiments, the de-icer remains adhered to the aerodynamic surface during inflation and deflation of the tubes.

According to an aspect of the disclosure, a method of assembling a de-icer is provided and includes forming first and second structural layers to each comprise a centerline and a non-inflatable edge angled with respect to the centerline, adhering the first and second structural layers together to form a non-inflatable edge area extending along at least the non-inflatable edge and surrounding a central area and stitching the first and second structural layers together in the central area to form tubes comprising an outermost tube which is closest to and parallel with the non-inflatable edge.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As will be described below, a configuration of tubes in a de-icer is provided such that the last or outermost de-icer tube is parallel to an edge of the de-icer instead of the centerline of the de-icer. In some cases, that last or outermost tube is edge-parallel and formed with a reduced width as compared to the other tubes. The non-inflatable edge is used to prevent peeling or non-adhesion of the de-icer from the surface of the airfoil. The edge parallel reduced width tube provides for reduced loading on the edge stitchline whereby the non-inflatable edge can maintain better adhesion to the airfoil surface. With reduced loading on the non-inflatable edge offered by the last or outermost tube being edge-parallel with or without the last or outermost tube also having a reduced width, the non-inflatable edge can be narrower as compared to conventional non-inflatable edge widths.

Figure 1:
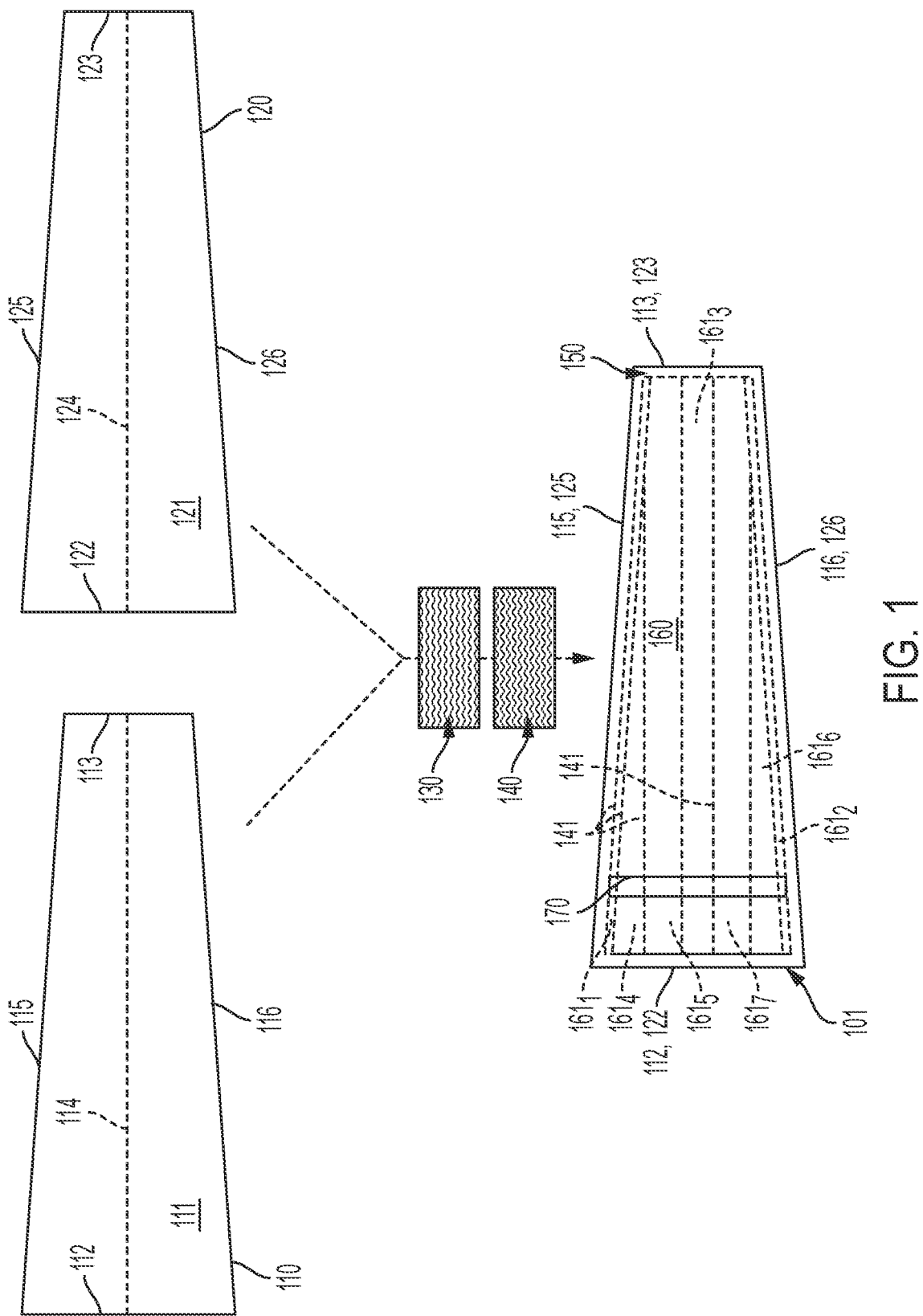
FIG. 1 is a schematic diagram illustrating a de-icer and components thereof in accordance with embodiments.
Figure 2:
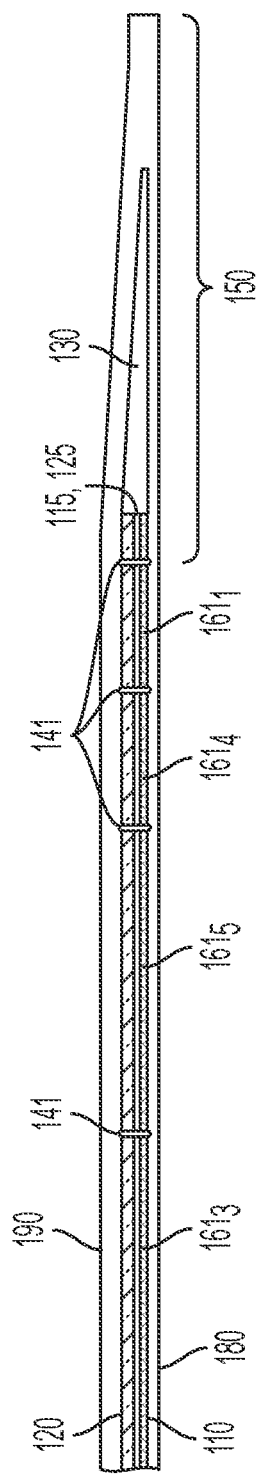
FIG. 2 is a sectional view of an edge of the de-icer shown in FIG. 1 in accordance with embodiments.

With reference to FIGS. 1 and 2, a de-icer 101 is provided and includes a first carcass structural material layer 110, a second carcass structural material layer 120, edge sealing material 130, stitching 140, a bond layer 180 (see FIG. 2) and an erosion layer 190 (see FIG. 2). The de-icer 101 can further include a manifold 170.

The first carcass structural material layer 110 can have a trapezoidal (or, more particularly, rectangular) shape 111 with a wide end 112, a narrow end 113, a centerline 114 extending between the wide end 112 and the narrow end 113 and a tapered or non-inflatable edge 115. The centerline 114 is disposed at a normal angle with respect to the wide end 112 and the narrow end 113. The tapered or non-inflatable edge 115 is located at a first side of the centerline 114 and extends between the wide end 112 and the narrow end 113. The tapered or non-inflatable edge 115 is angled with respect to the centerline 114. The first carcass structural material layer 110 can further include an additional tapered or non-inflatable edge 116 at a second side of the centerline 114. The additional tapered or non-inflatable edge 116 extends between the wide end 112 and the narrow end 113 and is angled with respect to the centerline 114. The second carcass material layer 120 can have a trapezoidal shape 121 with a wide end 122, a narrow end 123, a centerline 124 extending between the wide end 122 and the narrow end 123 and a tapered or non-inflatable edge 125. The centerline 124 is disposed at a normal angle with respect to the wide end 122 and the narrow end 123. The tapered or non-inflatable edge 125 is located at a first side of the centerline 124 and extends between the wide end 122 and the narrow end 123. The tapered or non-inflatable edge 125 is angled with respect to the centerline 124. The second carcass structural material layer 120 can further include an additional tapered or non-inflatable edge 126 at a second side of the centerline 124. The additional tapered or non-inflatable edge 126 extends between the wide end 122 and the narrow end 123 and is angled with respect to the centerline 124.

The edge sealing material 130 is disposed to adhere the first and second carcass structural material layers 110 and 120 together to form a non-inflatable edge area 150. More particularly, the edge sealing material 130 is disposed to adhere the wide ends 112 and 122 together, the narrow ends 113 and 123 together, the tapered or non-inflatable edges 115 and 125 together and the additional tapered or non-inflatable edges 116 and 126 together. In this way, the non-inflatable area 150 extends along at least the tapered or non-inflatable edge 115 and the additional tapered or non-inflatable edge 125 as well as the wide ends 112 and 122 and the narrow ends 113 and 123 and surrounds a central area 160.

The stitching 140 is disposed to stitch the first and second carcass structural material layers 110 and 120 together in the central area 160 to form tubes $161_{1-7}$. The manifold 170 is fluidly communicative with the tubes $161_{1-7}$ such that the tubes $161_{1-7}$ are inflatable and de-inflatable for de-icing operations. The tubes $161_{1-7}$ include an outermost tube $161_1$, which is closest to and parallel with the tapered or non-inflatable edges 115 and 125 and the portion of the non-inflatable area 150 extending along the tapered or non-inflatable edges 115 and 125, and an additional outermost tube $161_2$, which is closest to and parallel with the additional tapered or non-inflatable edges 116 and 126 and the portion of the non-inflatable area 150 extending along the additional tapered or non-inflatable edges 116 and 126. The tubes $161_{1-7}$ further include a central interior tube(s) $161_3$, which is parallel with the centerlines 114 and 124, and central intermediate tubes $161_{4,\,5}$ and central intermediate tubes $161_{6,\,7}$, which are parallel with the centerlines 114 and 124 and chamfered by the outermost tube $161_1$ and the additional outermost tube $161_2$, respectively.

In accordance with embodiments, the stitching 140 can have a substantially same, repeating pattern 141 for defining each of the tubes $161_{1-7}$ and for particularly defining the outermost tube $161_1$ and the additional outermost tube $161_2$.

In accordance with further embodiments, the outermost tube $161_1$ and the additional outermost tube $161_2$ can be smaller (e.g., narrower) than the central interior tube $161_3$, the central intermediate tubes $161_{4,5}$ and the central intermediate tubes $161_{6,7}$.

With the outermost tube $161_1$ being parallel with the tapered or non-inflatable edges 115 and 125 and with the additional outermost tube $161_2$ being parallel with the additional tapered or non-inflatable edges 116 and 126, the de-icer 101 exhibits uniform loading on the portions of the non-inflatable area 150 extending along the tapered or non-inflatable edges 115 and 125 and the additional tapered or non-inflatable edges 116 and 126. This uniform loading permits the non-inflatable area 150 extending along the tapered or non-inflatable edges 115 and 125 and the additional tapered or non-inflatable edges 116 and 126 to be reduced in width when the parallel edge outermost tube $161_1$ and additional outermost tube $161_2$ are provided as compared to conventional instances of de-icers.

For example, in a conventional instance of a de-icer, the non-inflatable area could have a width of 1.25 inches (3.175 cm) or more with 1.0 inches (2.54 cm) being an absolute minimum width. By contrast and in accordance with embodiments, the non-inflatable area 150 extending along the tapered or non-inflatable edges 115 and 125 and the additional tapered or non-inflatable edges 116 and 126 can have a constant or substantially constant tube width of about ~0.5 to about ~0.9375 inches (~1.27 to about ~2.38125 cm). More particularly, the non-inflatable edge area 150 can have a constant or substantially constant width of about ~0.70 to about ~0.875 inches (~1.905 to about ~2.2225 cm).

With reference to FIG. 2, the sectional image is a view along the edge of the de-icer 101, showing some of the tubes $160_{1,4,5 \text{ and } 3}$, the first and second carcass structural material layers 110 and 120, the edge sealing material 130, the stitching 141, the bond layer 180 and the erosion layer 190.

Figure 3:
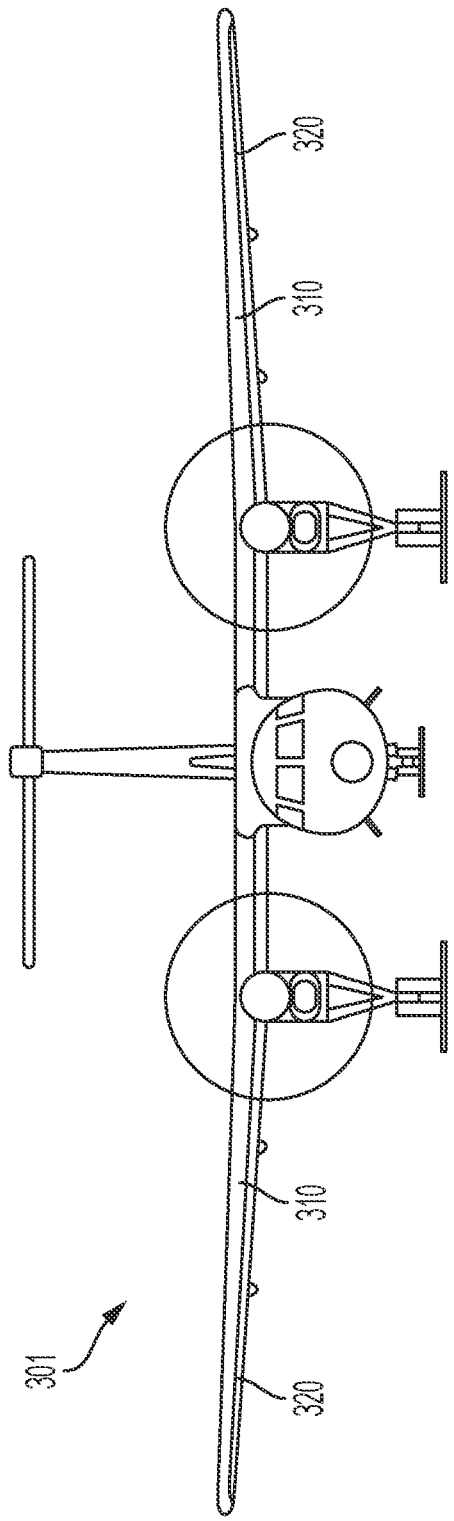
FIG. 3 is a perspective view of an aircraft including a de-icer as shown in FIG. 1 in accordance with embodiments.

With reference to FIG. 3, an aircraft 301 is provided and may be configured as a turboprop aircraft for example. In any case, the aircraft 301 includes an aerodynamic surface 310, such as a wing, a de-icer 320 as described above operably disposed on the aerodynamic surface 310, and a control system configured to control operations of the de-icer 320.

It is to be understood that the de-icer 320 can be adhered or otherwise fastened to the aerodynamic surface 310. In these or other cases, the tubes $161_{1-7}$ are inflated and deflated as described above during the operation of the de-icer 320 and the de-icer 320 remains adhered or otherwise fastened to the aerodynamic surface. This is achieved at least partly by the uniform loading resulting from the configuration of the outermost tube $161_1$ being parallel with the tapered or non-inflatable edges 115 and 125 and the additional outermost tube $161_2$ being parallel with the additional tapered or non-inflatable edges 116 and 126.

Figure 4:
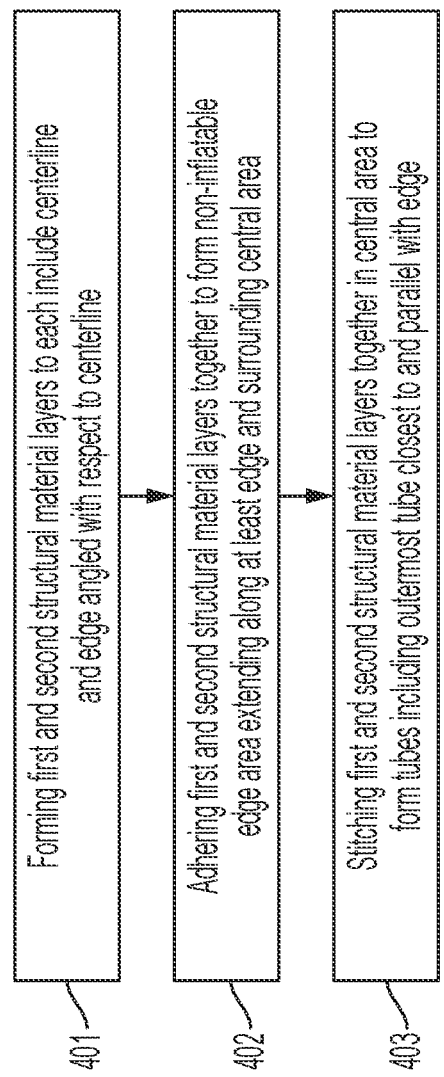
FIG. 4 is a flow diagram illustrating a method of assembling a de-icer in accordance with embodiments.

With reference to FIG. 4, a method of assembling a de-icer as described above is provided. As shown in FIG. 4, the method includes forming first and second carcass structural material layers to each include a centerline and an edge angled with respect to the centerline (401), adhering the first and second carcass structural material layers together to form a non-inflatable edge area extending along at least the edge and surrounding a central area (402) and stitching the first and second carcass structural material layers together in the central area to form tubes including an outermost tube which is closest to and parallel with the edge (403).

Technical effects and benefits of the present disclosure are the provision of a last or outermost de-icer tube of a de-icer, which is parallel with the edge of the de-icer and which has a relatively reduced size as compared to the other tubes in the de-icer. This results in loading on the non-inflatable edge of the de-icer being reduced and thus allowing for a relatively narrow non-inflatable edge.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A de-icer, comprising:
    first and second structural layers each comprising a centerline and a non-inflatable edge angled with respect to the centerline;
    edge sealing material disposed to adhere the first and second structural layers together to form a non-inflatable edge area extending along at least the non-inflatable edge and surrounding a central area; and
    stitching disposed to stitch the first and second structural layers together in the central area to form tubes comprising an outermost tube which is closest to and parallel with the non-inflatable edge.

2. The de-icer according to claim 1, wherein the first and second structural layers each have a trapezoidal shape with the non-inflatable edge and an additional non-inflatable edge on opposite sides of the centerline.

3. The de-icer according to claim 2, wherein the tubes comprise:
    multiple central tubes which are parallel with the centerline;
    the outermost tube; and
    an additional outermost tube which is closest to and parallel with the additional non-inflatable edge.

4. The de-icer according to claim 1, wherein the stitching has a same pattern for each of the tubes and the outermost tube.

5. The de-icer according to claim 1, wherein the non-inflatable edge area is about ~0.5 to about ~0.9375 inches (~1.27 to about ~2.38125 cm) wide.

6. The de-icer according to claim 1, wherein the non-inflatable edge area is about ~0.75 to about ~0.875 inches (~1.905 to about ~2.2225 cm) wide.

7. The de-icer according to claim 1, wherein the outermost tube is narrower than at least one of the other tubes.

8. An aircraft, comprising:
    an aerodynamic surface; and a de-icer according to claim 1 operably disposed on the aerodynamic surface.

9. The aircraft according to claim 8, wherein the de-icer remains adhered to the aerodynamic surface during inflation and deflation of the tubes.

10. A de-icer, comprising:
first and second structural layers, each comprising wide and narrow ends, a centerline extending between the wide and narrow ends and a non-inflatable edge which extends between the wide and narrow ends and is angled with respect to the centerline;
edge sealing material disposed to adhere the first and second structural layers together to form a non-inflatable edge area extending along at least the non-inflatable edge and surrounding a central area; and
stitching disposed to stitch the first and second structural layers together in the central area to form tubes,
the tubes being inflatable and de-inflatable for de-icing operations and comprising an outermost tube which is closest to and parallel with the non-inflatable edge.

11. The de-icer according to claim 10, wherein the first and second structural layers each have a trapezoidal shape with the non-inflatable edge and an additional non-inflatable edge on opposite sides of the centerline.

12. The de-icer according to claim 11, wherein the tubes comprise:
multiple central tubes which are parallel with the centerline;
the outermost tube; and
an additional outermost tube which is closest to and parallel with the additional non-inflatable edge.

13. The de-icer according to claim 11, wherein the non-inflatable edge area extends along the wide and narrow ends, the non-inflatable edge and the additional non-inflatable edge.

14. The de-icer according to claim 10, wherein the stitching has a same pattern for each of the tubes and the outermost tube.

15. The de-icer according to claim 10, wherein the non-inflatable edge area is about ~0.5 to about ~0.9375 inches (~1.27 to about ~2.38125 cm) wide.

16. The de-icer according to claim 10, wherein the non-inflatable edge area is about ~0.75 to about ~0.875 inches (~1.905 to about ~2.2225 cm) wide.

17. The de-icer according to claim 10, wherein the outermost tube is narrower than at least one of the other tubes.

18. An aircraft, comprising:
an aerodynamic surface; and
a de-icer according to claim 1 operably disposed on the aerodynamic surface.

19. The aircraft according to claim 18, wherein the de-icer remains adhered to the aerodynamic surface during inflation and deflation of the tubes.

20. A method of assembling a de-icer, the method comprising:
forming first and second structural layers to each comprise a centerline and a non-inflatable edge angled with respect to the centerline;
adhering the first and second structural layers together to form a non-inflatable edge area extending along at least the non-inflatable edge and surrounding a central area; and
stitching the first and second structural layers together in the central area to form tubes comprising an outermost tube which is closest to and parallel with the non-inflatable edge.

\* \* \* \* \*